(12) United States Patent
Gao et al.

(10) Patent No.: US 9,977,877 B2
(45) Date of Patent: May 22, 2018

(54) SYSTEM AND METHOD FOR TERMINATING COPYRIGHT INFRINGEMENT BY BITTORRENT USERS

(71) Applicants: Xin Gao, Shenyang Shi (CN); William Gorfein, New York, NY (US); Josh Partridge, New York, NY (US)

(72) Inventors: Xin Gao, Shenyang Shi (CN); William Gorfein, New York, NY (US); Josh Partridge, New York, NY (US)

(73) Assignee: IP SQUARED TECHNOLOGIES HOLDING, LLC, New York, NY (US)

( * ) Notice: Subject to any disclaimer, the term of this patent is extended or adjusted under 35 U.S.C. 154(b) by 0 days. days.

(21) Appl. No.: 13/847,418

(22) Filed: Mar. 19, 2013

(65) Prior Publication Data

US 2014/0289860 A1    Sep. 25, 2014

(51) Int. Cl.
*G06F 21/10* (2013.01)
*G06F 21/16* (2013.01)

(52) U.S. Cl.
CPC .............. *G06F 21/10* (2013.01); *G06F 21/16* (2013.01)

(58) Field of Classification Search
CPC . H04L 63/205; H04L 67/1002; H04L 67/104; G06F 21/10; G06F 21/16
See application file for complete search history.

(56) References Cited

U.S. PATENT DOCUMENTS

| 8,370,874 | B1 * | 2/2013 | Chang et al. | 725/46 |
|---|---|---|---|---|
| 9,129,420 | B2 * | 9/2015 | Baldwin | G06F 21/00 |
| 2006/0029093 | A1 * | 2/2006 | Van Rossum | G06F 17/30017 370/432 |
| 2007/0118910 | A1 * | 5/2007 | Taylor | 726/27 |
| 2009/0100128 | A1 * | 4/2009 | Czechowski et al. | 709/203 |
| 2010/0008509 | A1 * | 1/2010 | Matsushita et al. | 380/279 |
| 2011/0276449 | A1 * | 11/2011 | Funderburk | G06Q 30/04 705/34 |
| 2011/0289321 | A1 * | 11/2011 | Prince | 713/182 |
| 2012/0203880 | A1 * | 8/2012 | Kluyt et al. | 709/223 |
| 2012/0272331 | A1 * | 10/2012 | Lemaster et al. | 726/27 |
| 2013/0014014 | A1 * | 1/2013 | Edwards et al. | 715/716 |
| 2013/0124560 | A1 * | 5/2013 | O'Sullivan et al. | 707/769 |
| 2014/0289862 | A1 * | 9/2014 | Gorfein | G06F 21/10 726/26 |
| 2017/0208034 | A1 * | 7/2017 | Rostami-Hesarsorkh | H04L 63/0227 |
| 2017/0310558 | A1 * | 10/2017 | Veres | H04L 41/14 |

* cited by examiner

*Primary Examiner* — Chau Le
(74) *Attorney, Agent, or Firm* — Cotman IP Law Group, PLC

(57) ABSTRACT

A system and method that tracks copyright infringing BitTorrent users is presented. The system searches torrent file websites for a torrent file according to specified search criteria and verifies that the torrent file corresponds to a media file containing the copyrighted work. The system obtains tracker server information from the torrent file and obtains the IP addresses of participants currently connected to the torrent file from the tracker server, attempts to establish a connection with a participant based on an IP address selected from the IP addresses and, if successful, receives a data piece with a cryptographic hash from the participant. The cryptographic hash is verified to correctly match with the torrent file. The system then verifies that the participant is sharing the media file, obtains the participant's geographic data and associates the participant to a legal jurisdiction based on the geographic data.

20 Claims, 13 Drawing Sheets

Add Movie

350 → 
- Related Title: — 352
- Right Owner: — 354
- Search Interval(hours): 24 — 356
- [Add Movie] — 358

See Data

360 →

| ID | Related Title |
|---|---|
| 2 | Scary or Die |
| 4 | The Man From Nowhere |
| 5 | The Secret Reunion |
| 6 | The Letter |
| 8 | SOME GUY WHO KILLS PEOPLE |

PAGE 1

The following recorded addresses were downloading the same file.
Hash tag: "59C7FF978 3E2CA6A582C8A63860AF098EC3E7518"

File Name: "torrentdownloads.net Scary Or Die 2012 DVDRip XviD-IGUANA.torrent [mooovs.eu]
Scary_Or_Die_2012_DVDRip_XviD_IGUANA.torrent Scary.Or.Die.2012.DVDRip.XviD.IGUANA.torrent
59C7FF9783E2CA6A582C8A63860AF098EC3E7518.torrent Scary.Or.Die.2012.DVDRip."

| Host IP address | Capture Time UTC (Most Recent) | ISP |
|---|---|---|
| 67.76.3.163 | 10/3/2012 14:37:16 | EMBARQ CORPORATION |
| 67.233.132.248 | 11/6/2012 21:40:30 | EMBARQ CORPORATION |
| 67.233.194.114 | 12/8/2012 0:38:32 | EMBARQ CORPORATION |
| 67.238.134.141 | 10/3/2012 14:37:16 | EMBARQ CORPORATION |
| 67.235.163.125 | 12/11/2012 13:56:17 | EMBARQ CORPORATION |
| 67.235.167.183 | 11/4/2012 22:04:36 | EMBARQ CORPORATION |
| 67.235.175.4 | 12/18/2012 23:38:36 | EMBARQ CORPORATION |
| 67.235.280.209 | 12/5/2012 4:27:32 | EMBARQ CORPORATION |
| 67.235.286.174 | 11/13/2012 3:03:40 | EMBARQ CORPORATION |
| 67.235.294.39 | 11/18/2012 22:18:58 | EMBARQ CORPORATION |
| 67.237.133.73 | 10/3/2012 14:37:16 | EMBARQ CORPORATION |
| 67.237.173.78 | 11/13/2012 2:35:33 | EMBARQ CORPORATION |
| 67.239.227.183 | 10/14/2012 5:32:52 | EMBARQ CORPORATION |
| 69.34.8.134 | 11/25/2012 19:38:15 | EMBARQ CORPORATION |
| 68.68.79.93 | 11/16/2012 15:12:04 | EMBARQ CORPORATION |
| 71.3.255.248 | 10/3/2012 14:37:16 | EMBARQ CORPORATION |
| 71.48.248.21 | 10/3/2012 14:37:16 | EMBARQ CORPORATION |
| 71.196.35.242 | 11/30/2012 2:41:21 | Comcast Cable Communications LLC |
| 71.199.260.58 | 10/28/2012 16:48:04 | Comcast Cable Communications LLC |
| 71.203.188.37 | 11/13/2012 23:30:27 | Comcast Cable Communications LLC |
| 71.203.53.254 | 10/29/2012 6:39:44 | Comcast Cable Communications LLC |
| 71.203.83.93 | 10/3/2012 14:37:16 | Comcast Cable Communications LLC |

PAGE 2 (Next Excel Tab)

The following recorded addresses were downloading the same file.
Hash tag: 9GD6870F9G67C0F076990F9065080F6980G File Name: "torrentdownloads.net Scary Or Die 2012 DVDRip XviD-IGUANA.torrent [mooovs.eu]
Scary_Or_Die_2012_DVDRip_XviD_IGUANA.torrent Scary.Or.Die.2012.DVDRip.XviD.IGUANA.torrent

| Host IP address | Capture Time UTC (Most Recent) | ISP |
|---|---|---|
| 71.52.3.193 | 11/14/2012 12:36:26 | EMBARQ CORPORATION |
| 71.52.12.281 | 10/18/2012 17:00:17 | EMBARQ CORPORATION |
| 71.52.106.138 | 10/18/2012 13:22:08 | EMBARQ CORPORATION |
| 71.53.246.179 | 10/3/2012 14:37:16 | EMBARQ CORPORATION |
| 76.8.177.107 | 11/3/2012 9:06:30 | EMBARQ CORPORATION |
| 76.8.177.117 | 11/3/2012 6:25:28 | EMBARQ CORPORATION |
| 76.3.17.225 | 10/3/2012 14:37:16 | EMBARQ CORPORATION |
| 76.5.49.188 | 10/3/2012 14:37:16 | EMBARQ CORPORATION |
| 174.48.135.21 | 10/16/2012 12:39:56 | Comcast Cable Communications LLC |
| 174.58.11.115 | 10/16/2012 8:37:08 | Comcast Cable Communications LLC |
| 24.127.228.99 | 10/28/2012 8:09:02 | Comcast Cable Communications LLC |
| 24.128.21.2 | 10/16/2012 17:13:55 | Comcast Cable Communications LLC |
| 98.238.112.155 | 11/8/2012 0:38:48 | Comcast Cable Communications LLC |

FIGURE 5C

[ Update ]   [ Select All ]   [ Select None ]

From Date: [          ]    To Date: [          ]

(13)  ☐ 9FAAB424ADC7A3ACF8272DDDC3C1BC4C165D2674
(43)  ☐ 98B3AAF87DE338938822F86893ED58088A1600D9
(1)   ☐ 0DB65DFCC613842FA3A3C84571549F382D18AF06
(152) ☐ E78398D2AF210469FED284BCA2D567B65288F72A
(49)  ☐ 6C18728C64E6102028D71D573FD8FE019AB43450
(32)  ☐ 1AB9BD124719A1715F2ECBA44E9DE533959353D1
(201) ☐ 337C326734C0E24034823C10A38F92421904AC41

(12)  ☐ COX COMMUNICATIONS
(5)   ☐ QWEST COMMUNICATIONS COMPANY LLC
(260) ☐ ROAD RUNNER HOLDCO LLC
(23)  ☐ CABLE ONE INC.
(10)  ☐ CRICKET COMMUNICATIONS INC
(5)   ☐ VERIZON WIRELESS

(56)  ☐ Washington Eastern
(12)  ☐ Washington Western
(75)  ☐ California Northern
(76)  ☐ Texas Eastern
(1)   ☐ Texas Northern
(0)   ☐ Texas Southern
(32)  ☐ Texas Western

FIGURE 5D

| IP Address | Date (UTC) | First Name | Last Name | Address | Address 2 | Unit 2 | City | State | Zip Code | Country | Telephone | Email |
|---|---|---|---|---|---|---|---|---|---|---|---|---|
| 256.256.256.256 | 11/4/2013 15:30:45 | Jon | Doe | 8521 Summerset Dr | | | Plano | TX | 76114 | USA | 512-564-8134 | N/A |
| 13.46.188.12 | 1/5/2013 14:32:54 | Jane | Doe | 421 Euclid Ave | | | Tempe | AZ | 85746 | USA | N/A | jane@me.com |

SYSTEM AND METHOD FOR TERMINATING COPYRIGHT INFRINGEMENT BY BITTORRENT USERS

BACKGROUND OF THE INVENTION

1. Field of the Invention

The present invention relates to copyright infringement by peer-to-peer file sharing, and more specifically, to terminating copyright infringement by users of the BitTorrent peer-to-peer file sharing protocol.

2. Description of the Related Art

The broad accessibility of broadband internet service has allowed users to quickly and often illegally download media files such as music, movies, and games.

The most widespread method of transferring media files on the Internet is the client-server model. A central server sends the entire file to each client that requests it. The clients only communicate with the server, and never to each other. The main advantage of this method is that it is simple to set up. However, this method can be problematic with files that are large or very popular. It requires a great deal of bandwidth and server resources to distribute such a file, since the server must transmit the entire file to each client. Mirrors partially address this shortcoming by distributing the load across multiple servers, but at a significant expense.

Another popular method of transferring media uses a peer-to-peer network. BitTorrent is the most popular protocol for transferring large files over peer-to-peer networks and have accounted for a large percentage of total internet traffic. BitTorrent works by separating a file to be transferred into many small pieces to be distributed amongst multiple computers. A computer may receive one piece of the file from one particular computer, while simultaneously getting another piece of the file from a different computer. Any computer has the ability to upload already downloaded pieces of the file to any other computer that lacks that piece of the file.

The act of file sharing itself is not illegal and peer-to-peer networks are also used for legitimate purposes. However, peer-to-peer file sharing also provides a powerful tool for violating copyright laws by allowing users to share and distribute copyrighted works without permission.

There is a current need for an efficient means of tracking and stopping copyright infringement by BitTorrent users.

BRIEF SUMMARY OF THE INVENTION

One or more embodiments of an invention described herein provide for a system and method that tracks copyright infringing BitTorrent users. One embodiment creates a search criteria based on a copyrighted work. The system maintains a website database of at least one torrent file website and searches each of the torrent file websites for a torrent file according to the search criteria. The system stores the torrent file to a torrent file database and verifies that the torrent file corresponds to a media file containing the copyrighted work. The system obtains tracker server information from the torrent file. A plurality of participant IP addresses of participants currently connected to the torrent file is obtained from the tracker server. The plurality of participant IP addresses is stored into an IP address database. The system attempts to establish a connection with a participant associated with an IP address selected from the plurality of participant IP addresses in the database and receives a data piece with a cryptographic hash from the participant. The cryptographic hash is verified to correctly match with the torrent file. The system receives a download completion status from the participant and records a corresponding capture time and verifies that the participant is sharing the media file. The participant is disconnected. The system obtains geographic data of the participant based on the participant IP address and associates the participant to a legal jurisdiction based on the geographic data. With the IP and geographic information about the user, proper legal remedy may be sort in the proper jurisdiction. The legal remedy may be in the form of DMCA (Digital Millennium Copyright Act) takedown letters, and/or other legal action.

These and other aspects of the present invention will become more fully understood upon further review of the following specifications and accompanying drawings.

BRIEF DESCRIPTION OF THE DRAWINGS

The above and other aspects, features and advantages of the invention will be more apparent from the following more particular description thereof, presented in conjunction with the following drawings wherein:

FIGS. 3A-B illustrate exemplary screenshots of an administrator interface in accordance with the system and methods for terminating copyright infringement by BitTorrent users described herein;

FIGS. 4A-C illustrate exemplary screenshots of the user interface in accordance with the system and methods for terminating copyright infringement by BitTorrent users described herein.

FIGS. 5A-D illustrate exemplary screenshots of the user interface to the infringer data in accordance with the system and methods for terminating copyright infringement by BitTorrent users described herein.

FIG. 6 illustrates an exemplary data table from an ISP for infringer information in accordance with the system and methods for terminating copyright infringement by BitTorrent users described herein.

DETAILED DESCRIPTION

A system and method for terminating copyright infringement by BitTorrent users will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the true scope of the invention.

Torrent files are registered with at least one tracker server. The tracker server maintains lists of the peers currently participating in the torrent file. Participants (peers) that want to download the file must first obtain a torrent file for it and connect to the specified tracker server, which tells them from which other peers to download the pieces of the file. The task of distributing the file is shared by those who want it. The file being distributed is divided into evenly sized segments called pieces. As each peer attempting to download the media file receives a new piece of the file it becomes a source of that piece for other peers.

Each peer uses BitTorrent client software to make use of the torrent file. Pieces are typically downloaded non-sequentially and are rearranged into the correct order when all the pieces are complete by the BitTorrent client. The BitTorrent client monitors which pieces it needs, and which pieces it has and can upload to other peers. Due to the nature of this approach, the download of any file can be halted at any time and be resumed at a later date, without the loss of previously downloaded pieces.

Figure 1:
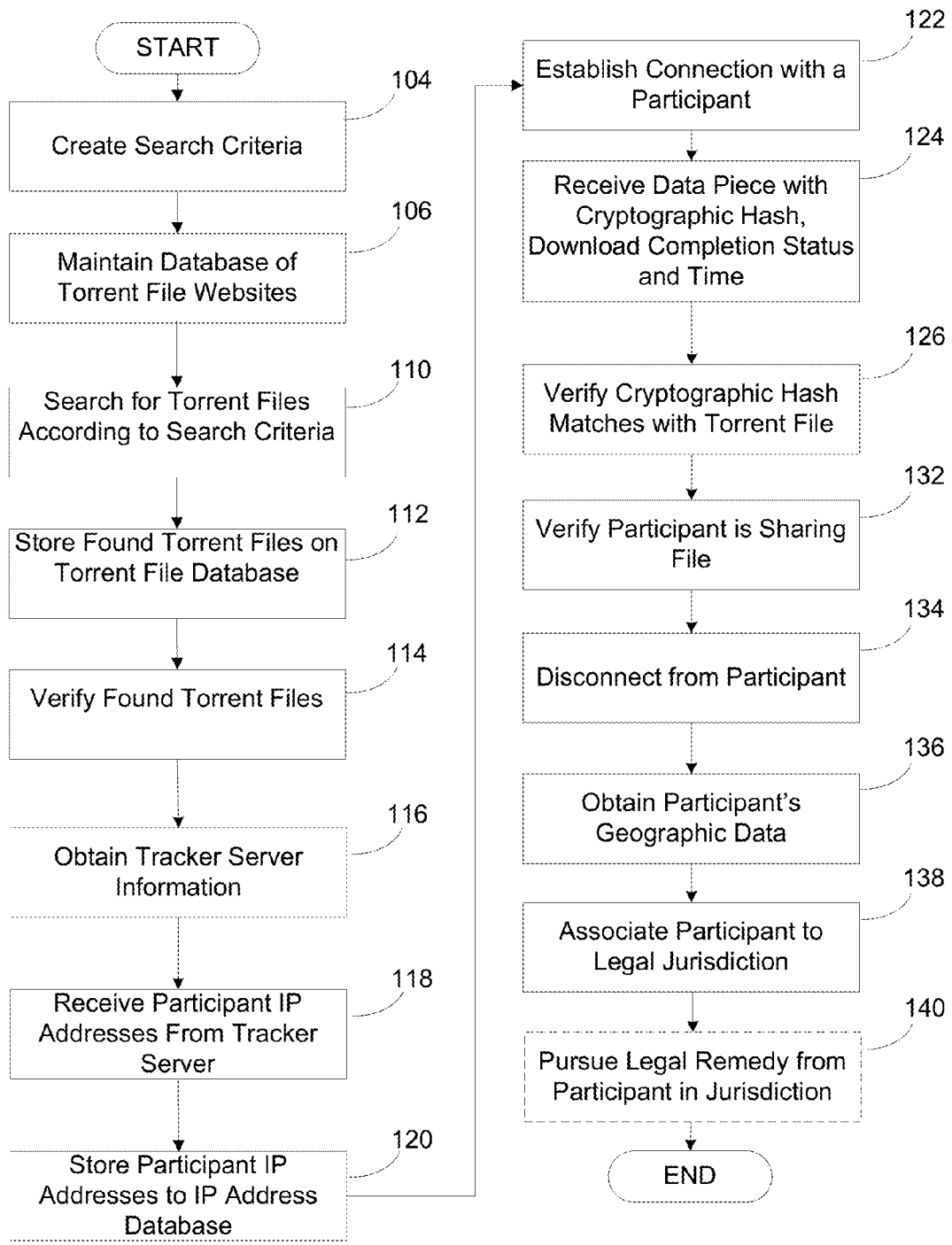
FIG. 1 illustrates a flowchart of an exemplary method in accordance with the system and method for terminating copyright infringement by BitTorrent users described herein.

FIG. 1 illustrates a flowchart of an exemplary method in accordance with the system and method for terminating copyright infringement by BitTorrent users described herein. The copyrighted work is typically a movie, music, books, or software, but can be anything copyrightable that can be expressed in a computer media file. Typically copyright infringers use BitTorrent as a method of obtaining copyrighted works that may otherwise be bought for monetary value. To use BitTorrent to make a media file available to the public, a small sized torrent descriptor file (torrent file) is first created. The torrent file is distributed by conventional means such as through the web using the client-server model. Torrent files are typically published on websites or elsewhere.

In some embodiments of a system and method for terminating copyright infringement by BitTorrent users, a computer system executes instructions for a method stored on a computer-readable medium. In an exemplary embodiment, the computer system runs a Linux based operating system with the instructions written in a combination of C and Python programming languages. A search criteria based on a copyrighted work is created at step 104. The search criteria are created to find torrent files corresponding to media files containing the copyrighted work. The search criteria include at least a predetermined set of keywords based on a type of content of the copyrighted work. For example, to find torrent files corresponding to the movie "Gladiator," a sample search criteria may contain file name restrictions such as "Gladiator 2000 avi full 1080p." Such file name restrictions would look for torrent files with those words in its file name. The "2000" keyword is to narrow the search to movies released in the year 2000. The "avi" keyword is to restrict the search to only media files with the .avi extension. The "full" keyword is for exclusion of movie trailers and other shorted files. The "1080p" keyword restricts the search to movie files with a 1080p resolution quality. The search criteria may also include other criteria such as media file size to look through the "info" sections of torrent files.

In some exemplary embodiments, the search criteria include a predetermined set of keywords based on a type of content of the copyrighted work. For example, a predetermined set of keywords may be "RAZOR RELOADED SKIDROW" when the type of content of the copyrighted work is computer game software. RAZOR, RELOADED, and SKIDROW are included in the predetermined set of keywords because they are the names of well known, unauthorized, and illegal publishers of computer game software. These keywords are typically included in torrent file names for media files containing their published content.

A database of at least one torrent file website is maintained at step 106. Ideally, a list of all known or popular websites that publishes torrent files will be stored in a database. Popular websites include dedicated torrent file servers that allow participants to conduct searches with a browser interface and forums that allow participants to post torrent files for other participants to download.

Each of the torrent file websites are searched for a torrent file according to the search criteria at step 110. This may be accomplished using a number of well known web scraping methods which extracts information from websites. Such web scraping methods include HTML parsers and data mining algorithms. If the torrent file has been previously found, it will be ignored to prevent duplicates. In some embodiments, after every set period of time, each of said torrent file websites is re-searched again for a torrent file according to said search criteria. The torrent file found is stored to a torrent file database at step 112.

The torrent file is verified to correspond to a media file containing the copyrighted work at step 114. This verification may be automatically accomplished through an algorithm, manually by an administrator (or user), or a combination of the two. The most error proof method of verifying a torrent file is to download the entire media file and then viewing it manually by an administrator. By convention, the name of a torrent file has the suffix .torrent. This torrent file contains metadata about the files to be shared and about the tracker server, which is a computer that coordinates the file distribution. Torrent files have an "announce" section, which specifies the URL of the tracker server, and an "info" section, containing suggested names for the files, their lengths, the piece length used, and a cryptographic hash code for each piece. The metadata, such as the "info" section and the "announce" section, in the torrent file, may be entered into an algorithm to automatically verify the torrent file. A web interface may also be configured to allow the administrator (or user) to view each torrent file and its metadata manually to verify.

Tracker server information is obtained from the torrent file at step 116. The metadata of the torrent file specifies the URL of the tracker server. The tracker server is a server that coordinates the communication between peers using the same torrent file to download the media file. The tracker server maintains information about all peers using the torrent file including their IP addresses to allow peers to connect to one another. An Internet Protocol Address (IP address) is a numerical label assigned to each device participating in a computer network that uses the Internet Protocol for communication. The IP addresses of all the peers (i.e. participant IP addresses) currently connected to the torrent file, generally a plurality of addresses, are received at step 118. These participant IP addresses are stored into an IP address database at step 120. In some embodiments, after a set period of time, the participant IP addresses may be updated by receiving a new set of participant IP addresses from the tracker server. The web interface, described with respect to FIG. 3A, may also be configured to allow the administrator (or user) to view the participant IP addresses stored on the IP address database.

An attempt is made to establish connection with a participant using a participant IP address selected from the plurality of participant IP addresses at step 122. A request is sent for a data piece to the participant with the participant IP address selected. If successful, the participant will send back the data piece. Each data piece is protected by a cryptographic hash contained in the torrent descriptor. The cryptographic hash is an algorithm that maps large data sets to small data sets of a fixed length for the purpose of detecting duplicate records. The cryptographic hash ensures that any modification of the piece will be detected, and prevents both accidental and malicious modifications of any of the pieces. If a peer starts with an authentic copy of the torrent file, it can verify the authenticity of the entire file it receives. The data piece is received with a cryptographic hash from the participant at step 124. The cryptographic hash will typically use the hash function SHA-1 or MD5, but could be any other suitable hash function. The cryptographic hash is verified to correctly match with the torrent file at step 126.

A download completion status is also received from the participant and a corresponding capture time at step 124. The participant will send information that includes the participant's current download completion status, which indicates how many data pieces that the participant has finished downloading. When the download completion status is received, the current time is recorded as well.

The participant is verified to be sharing the media file at step 132. In some embodiments, receiving the data piece from the participant with a verified cryptographic hash, along with a significant Download Completion Status, is enough evidence to verify that the participant is sharing the media file using the torrent file.

The participant is disconnected at step 134. After receiving the data piece with the cryptographic hash and the download completion status from the participant, nothing further is required from the participant.

The geographic data of the participant is obtained based on the participant IP address at step 136. The participant IP address conveys a wealth of information about the participant's identification and location. A number of well known databases exist to correlate any IP address with its corresponding information. The participant's zip code, city, state, longitude, latitude, and median income of residential area, and internet service provider (ISP) may be obtained by searching one of these databases for the participant IP address.

In some embodiments a web interface may be configured to allow the administrator (or user) to view the participant's geographic data such as the participant's zip code, city, state, longitude, latitude, and median income of residential area. The web interface may also be configured to allow the administrator (or user) to sort the participants according to a title of the copyrighted work in the media file. The web interface may be configured to allow the administrator (or user) to sort the participants according to internet service provider based on the participant IP address.

The participant is associated to a legal jurisdiction based on the participant's geographic data at step 138. The legal jurisdiction may be assigned based on the participant's zip code. In some embodiments, legal remedy may then be pursed for all participants of a particular jurisdiction at step 140. For instance, the owners of the copyrighted work may initiate a copyright infringement lawsuit against any participant verified to have been sharing the media file, and may group the lawsuits for multiple participants of the same legal jurisdiction. In addition, Digital Millennium Copyright Act (DMCA) takedown letters may be issued to the ISPs. In general, legal remedies may be pursued by Law Firms, for instance, that are part of an enforcement apparatus. Thus, an exemplary user of the systems and methods of the present invention is a member of a law firm.

Figure 2:
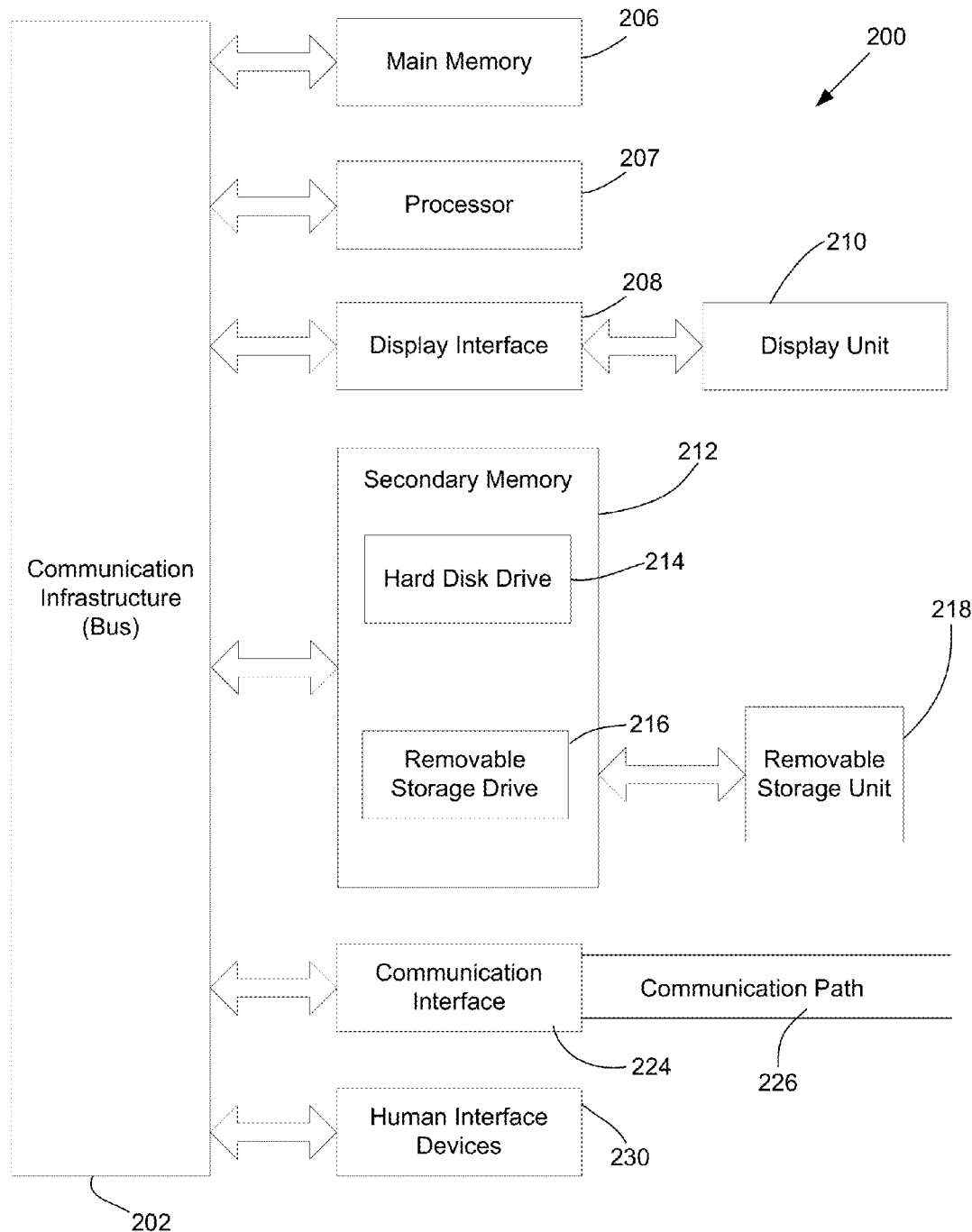
FIG. 2 illustrates a computer system in accordance with the system and method for terminating copyright infringement by BitTorrent users described herein.

FIG. 2 illustrates a computer system in accordance with the system and method for terminating copyright infringement by BitTorrent users described herein. A general-purpose computer and peripherals, when programmed as described herein, may operate as a specially programmed computer 200 capable of implementing one or more methods, apparatus and/or systems of the solution described in this disclosure. A processor 207 may be coupled to a bi-directional communication infrastructure 202 such as communication infrastructure system 202. The communication infrastructure 202 may generally be a system bus that provides an interface to the other components in the general-purpose computer system such as the processor 207, a main memory 206, a display interface 208, a secondary memory 212, and/or a communication interface 224.

The main memory 206 may provide a computer-readable medium for accessing stored data and applications. The display interface 208 may communicate with a display unit 210 that may be utilized to display outputs to a user of the specially programmed computer 200. The display unit 210 may comprise one or more monitors that may visually depict aspects of the computer program to the user. The main memory 206 and the display interface 108 may be coupled to the communication infrastructure 202, which may serve as the interface point to the secondary memory 212 and the communication interface 224. The secondary memory 212 may provide additional computer-readable medium resources beyond the main memory 206, and may generally function as a storage location for computer-readable instructions to be executed by processor 207. Either fixed or removable computer-readable media may serve as the secondary memory 212. The secondary memory 212 may comprise, for example, a hard disk 214 and a removable storage drive 216 that may have an associated removable storage unit 218. There may be multiple sources of the secondary memory 212 and systems implementing the solutions described in this disclosure may be configured as needed to support the data storage requirements of the user and the methods described herein. Numerous types of data storage devices may serve as repositories for data utilized by the specially programmed computer 200. For example, random access memory, read-only memory, solid-state storage, magnetic storage, optical or magnetic-optical storage, or any other available mass storage technology that provides a repository for digital information may be used.

The communication interface 224 may be coupled to the communication infrastructure 202 and may serve as a conduit for data destined for or received from a communication path 226. A network interface card (NIC) is an example of the type of device that once coupled to the communication infrastructure 202 may provide a mechanism for transporting data to the communication path 226. Computer networks such Local Area Networks (LAN), Wide Area Networks (WAN), Wireless networks, optical networks, distributed networks, the Internet or any combination thereof are some examples of the type of communication paths that may be utilized by the specially programmed computer 200. The communication path 226 may comprise any type of telecommunication network or interconnection fabric that can transport data to and from communication interface 224.

To facilitate user interaction with the specially programmed computer 200, one or more human interface devices (HID) 230 may be provided. Some examples of HIDs that enable users to input commands or data to the specially programmed computer 200 may comprise a keyboard, mouse, touch screen devices, microphones or other audio interface devices, motion sensors or the like, as well as any other device able to accept any kind of human input and in turn communicate that input to processor 207 to trigger one or more responses from the specially programmed computer 200 are within the scope of the system disclosed herein.

While FIG. 2 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. In one or more embodiments, the system may also encompass parallel systems, multi-processor systems, multi-core processors, and/or any combination thereof. Where a virtual machine, process, device or otherwise performs substantially similarly to that of a physical computer system, such a virtual platform will also fall within the scope of disclosure provided herein, notwithstanding the description herein of a physical system such as that in FIG. 2.

The computer-readable medium stores computer-readable instructions. The processor 207 executes the computer-readable instructions to create a search criteria based on a copyrighted work. The search criteria are created to find torrent files corresponding to media files containing the copyrighted work. The search criteria include at least a predetermined set of keywords based on a type of content of the copyrighted work.

The processor 207 executes the computer-readable instructions to maintain a website database of at least one torrent file website. Ideally, a list of all known or popular websites that publishes torrent files will be stored in a database. Popular websites include dedicated torrent file servers that allow users to conduct searches with a browser interface and forums that allow users to post torrent files for other users to download.

In some exemplary embodiments, the processor 207 executes the computer-readable instructions to maintain a web interface for use by the administrator (or user). The web interface may be used for a variety of purposes such as to allow the administrator (or user) to manually set the search criteria. Some embodiments provide for a console interface for administrator's use with text commands.

The processor 207 executes the computer-readable instructions to search each of the torrent file websites for a torrent file according to the search criteria. This may be accomplished using a number of well known web scraping methods which extracts information from websites. Such web scraping methods include HTML parsers and data mining algorithms. In some embodiments, after every set period of time, each of said torrent file websites are researched again for a torrent file according to said search criteria. The torrent file found is stored to a torrent file database.

The processor 207 executes the computer-readable instructions to verify the torrent file as corresponding to a media file containing the copyrighted work. This verification may be automatically accomplished through an algorithm, manually by an administrator (or user), or a combination of the two. The most error proof method of verifying a torrent file is to download the entire media file and then viewing it manually by an administrator (or user). By convention, the name of a torrent file has the suffix .torrent. This torrent file contains metadata about the files to be shared and about the tracker server, a computer that coordinates the file distribution. Torrent files have an "announce" section, which specifies the URL of the tracker server, and an "info" section, containing suggested names for the files, their lengths, the piece length used, and a cryptographic hash code for each piece. The metadata, such as the "info" section and the "announce" section, in the torrent file, may be entered into an algorithm to automatically verify the torrent file. A web interface may also be configured to allow the administrator (or user) to view each torrent file and its metadata manually to verify.

The processor 207 executes the computer-readable instructions to obtain a tracker server information from the torrent file. The metadata of the torrent file specifies the URL of the tracker server. The tracker server is a server that coordinates the communication between peers using the same torrent file to download the media file. The tracker server maintains information about all peers using the torrent file including their IP addresses to allow peers to connect to one another. An Internet Protocol Address (IP address) is a numerical label assigned to each device participating in a computer network that uses the Internet Protocol for communication. A plurality of participant IP addresses of peers currently connected to the torrent file is received. The plurality of participant IP addresses is stored into an IP address database. The web interface may also be configured to allow the administrator (or user) to view the plurality of participant IP addresses stored on the IP address database.

The processor 207 executes the computer-readable instructions to attempt to establish a connection with a participant with an IP address selected from the plurality of participant IP addresses. A request is sent for a data piece to the participant with the selected IP address. If successful, the participant will send back the data piece. Each data piece is protected by a cryptographic hash contained in the torrent descriptor. The cryptographic hash is an algorithm that maps large data sets to small data sets of a fixed length for the purpose of detecting duplicate records. The cryptographic hash ensures that any modification of the piece will be detected, and prevents both accidental and malicious modifications of any of the pieces. If a peer starts with an authentic copy of the torrent file, it can verify the authenticity of the entire file it receives. The data piece is received with a cryptographic hash from the participant. The cryptographic hash will typically use the hash function SHA-1 or MD5, but could be any other suitable hash function. The cryptographic hash is verified to correctly match with the torrent file.

The processor 207 executes the computer-readable instructions to receive a download completion status from the participant and a corresponding capture time is recorded. The participant will send information that includes the participant's current download completion status, which includes information on how many data pieces that the participant has finished downloading. When the download completion status is received, the current time is recorded as well.

The processor 207 executes the computer-readable instructions to verify that the participant is sharing the media file. In some embodiments, receiving the data piece from the participant with a verified cryptographic hash, along with a non-zero download completion status, may be enough evidence to verify that the participant is sharing the media file using the torrent file.

The processor 207 executes the computer-readable instructions to disconnect from the participant. After receiving the data piece with the cryptographic hash and the download completion status from the participant, nothing further is required from the participant.

The processor 207 executes the computer-readable instructions to obtain the participant's geographic data based on the participant IP address. The participant IP address conveys a wealth of information about the participant's identification and location. A number of well known databases exist to correlate any IP address with its corresponding information. The participant's zip code, city, state, longitude, latitude, and median income of residential area, and internet service provider may be obtained by searching one of these databases for the participant IP address.

In some embodiments, the processor 207 executes the computer-readable instructions to configure a web interface to allow the administrator (or user) to view the participant's geographic data such as the participant's zip code, city, state, longitude, latitude, and median income of residential area. The web interface may also be configured to allow the administrator (or user) to sort the participants according to a title of the copyrighted work in the media file. The web interface may be configured to allow the administrator (or user) to sort the participants according to internet service provider based on the participant IP address.

The processor 207 executes the computer-readable instructions to associate the participant to a legal jurisdiction based on the participant's geographic data. The legal jurisdiction may be assigned based on the participant's zip code. In some embodiments, legal remedy may then be pursed for all participants of a particular jurisdiction. The owners of the copyrighted work may initiate a copyright infringement lawsuit against any participant verified to have been sharing the media file, and may group the lawsuits for multiple participants of the same legal jurisdiction.

Figure 3A:
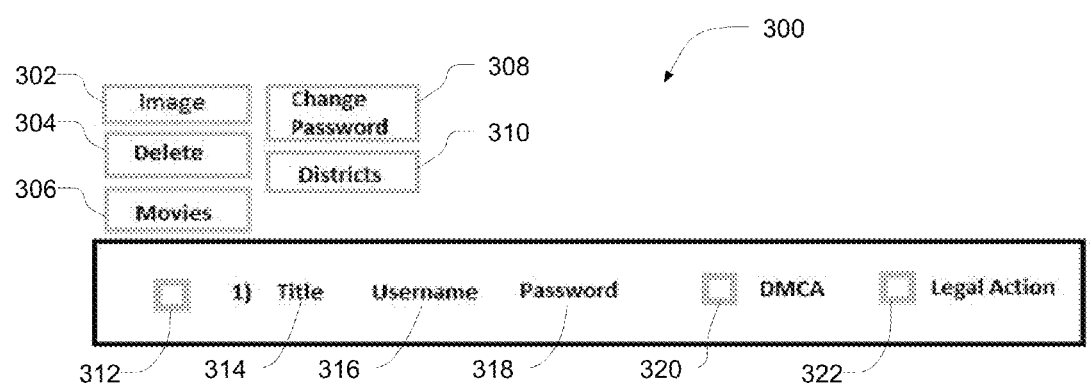

FIGS. 3A-B illustrate exemplary screenshots of an administrator interface in accordance with the system and methods for terminating copyright infringement by BitTorrent users described herein. Some embodiments of a system and method for terminating copyright infringement by BitTorrent users include maintaining a web interface for administrator 300. The web interface may be used for a variety of purposes such as to allow the administrator to manually set the search criteria. Some embodiments provide for a console interface for administrator use with text commands.

Module 300 represents an administrator interface display or part of a display. Administrator interface 300 provides a general interface for managing users and controlling copyrighted works being monitored. As illustrated, interface 300 comprises admin control functions such as "Image" 302, "Delete" function 304, "Movies" function 306, "Change Password" function 308, and "Districts" 310. The Delete function 304 may be configured to provide the administrator the ability to remove users (e.g. law firms) from the system. For instance, by checking check box 312 and activating Delete 304, the selected user is removed.

Movies function 306 provides the administrator the ability to add additional titles (i.e. copyrighted materials) into the database for monitoring. When activated, Movies function 306 launches the screenshots illustrated in FIG. 3B. FIG. 3B provides interface for the administrator to add new titles in section 350 and to view existing titles in section 360. For instance, section 350 includes "Related Title" field 352 for the administrator to add the title of a new recording to be monitored. The administrator may then enter the copyright owner in "Rights Owner" field 354 and the desired search interval in "Search Interval (hours)" field 356. The search interval corresponds to the frequency upon which the internet is searched for peer-to-peer downloading of the new title. Default is 24 hours. After the administrator is satisfied with the entries, the "Add Movie" button 358 may be clicked to enter the new title into the database. Thereafter, the new title appears in section 360, along with any other title previously entered.

Returning to FIG. 3A, "Districts" function 310 provides for viewing and setting of US District Court districts for the users. "Title" 314 is the name of the user (e.g. law firm); "Username" 316 and "Password" 318 represent the firm's login information; check box "DMCA" 320 may be checked if the firm is authorized to issue DMCA takedown letters; and check box "Legal Action" 322 may be check if the firm is authorized to proceed with legal action in the appropriate US District Court.

Figure 4A:
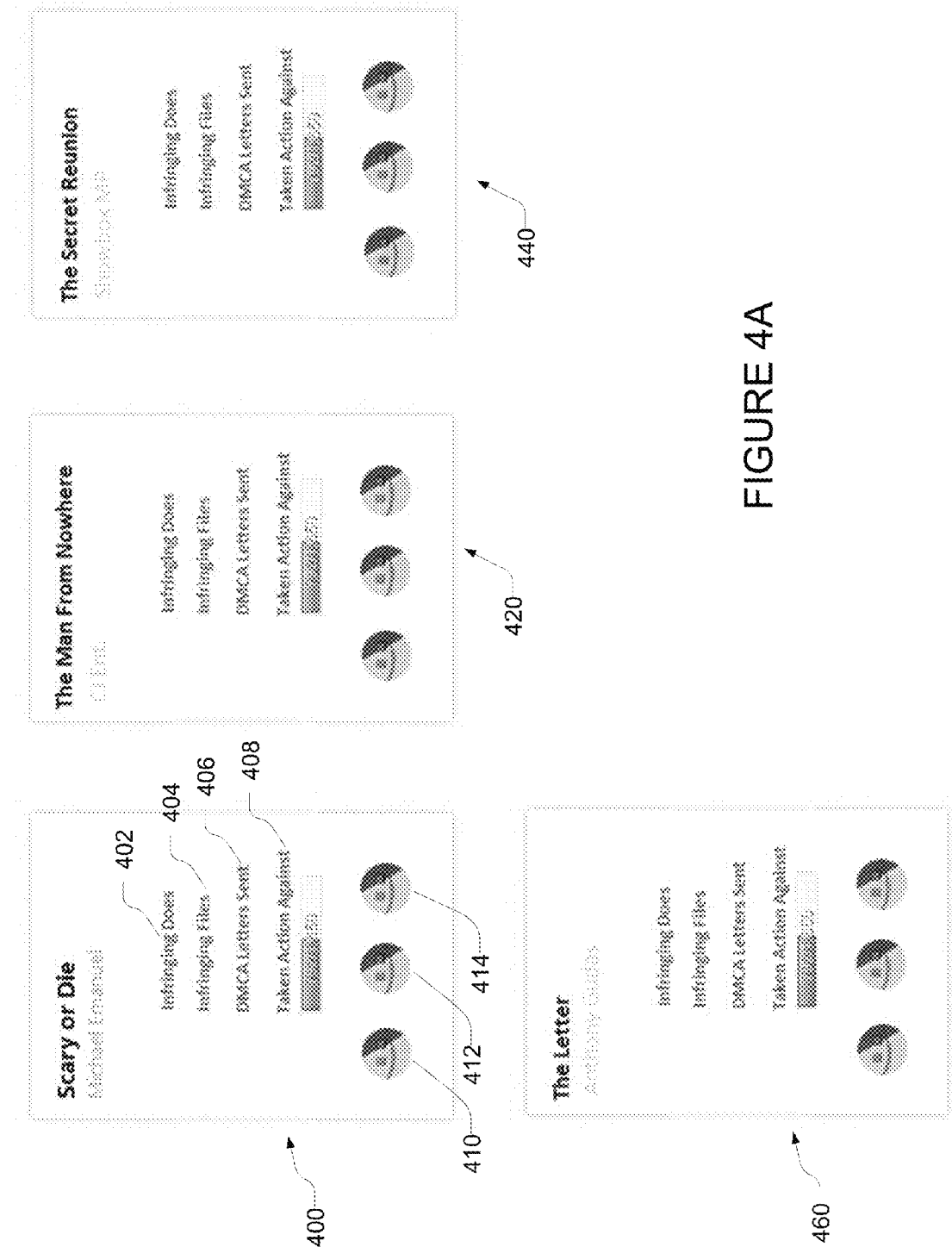
Figure 4B:
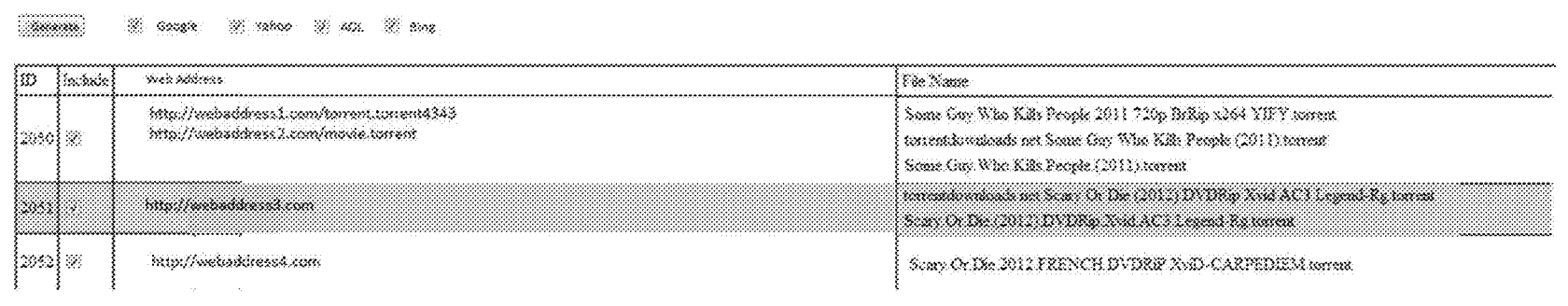
Figure 4C:
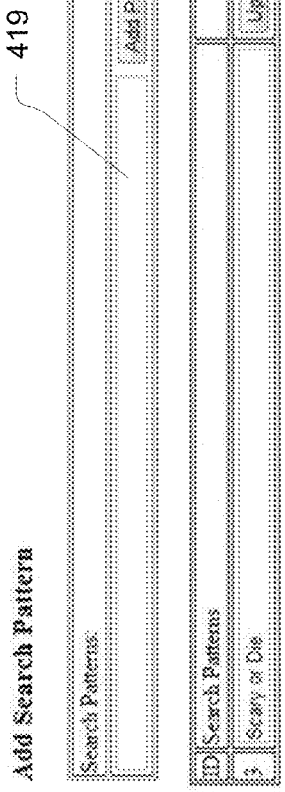

FIGS. 4A-C illustrate exemplary screenshots of the user interface in accordance with the system and methods for terminating copyright infringement by BitTorrent users described herein. FIG. 4A is a screenshot of the layout of the main screen which comprises several sections representing Titles (i.e. copyrighted materials) being monitored for copyright infringers. For instance, in the current illustration section 400 is for the copyrighted work "Scary or Die," owned by Michael Emanuel; section 420 is for "The Man From Nowhere," by CJ Ent.; section 440 is for "The Secret Union," by Showbox MP; and section 460 is for "The Letter," by Anthony Gudas.

To facilitate review of the performance of the methods of the present invention, each section (e.g. 400, 420, 440, and 460) displays information representing summary of the tracking and enforcement process for each title. For instance, "Infringing Does" 402 displays the number of unauthorized users of the copyrighted material "Scary or Die"; "Infringing Files" 404 displays the number of torrent files affected by the infringing activities; "DMCA Letters Sent" 406 represents the number of DMCA takedown letters sent to the ISPs of the infringing participants; and "Taken Action Against" 408 displays the number of infringing participants that legal action have been initiated against.

In addition to the summary display, each section provides a plurality of interface elements for the user of the system of the present invention to dig further into the database. In the illustration of section 400, these interfaces are represented by the Packman symbols 410, 412, and 414. The system may be configured such that activation of Interface 410 results in display of a window showing web addresses where torrent files for the title are located, as illustrated in the sample screenshot of FIG. 4B. Interface 410 could be implemented as a pushbutton, a hyperlink, etc.

Similarly, activation of Interface 414 may result in display of a window showing the torrent files for the title, as illustrated in the sample screenshot of FIG. 4C. With the interface of FIG. 4C, the user (reviewer or agent) of this system could add search queries or patterns for the title in textbox 419, include or exclude files from the list to be monitored and/or managed, and delete files. To exclude a file, the user will need to uncheck the checkbox 417 and vice versa to include the file. A file may also be deleted from the list by selecting the "Delete" pushbutton 418.

Figure 5A:
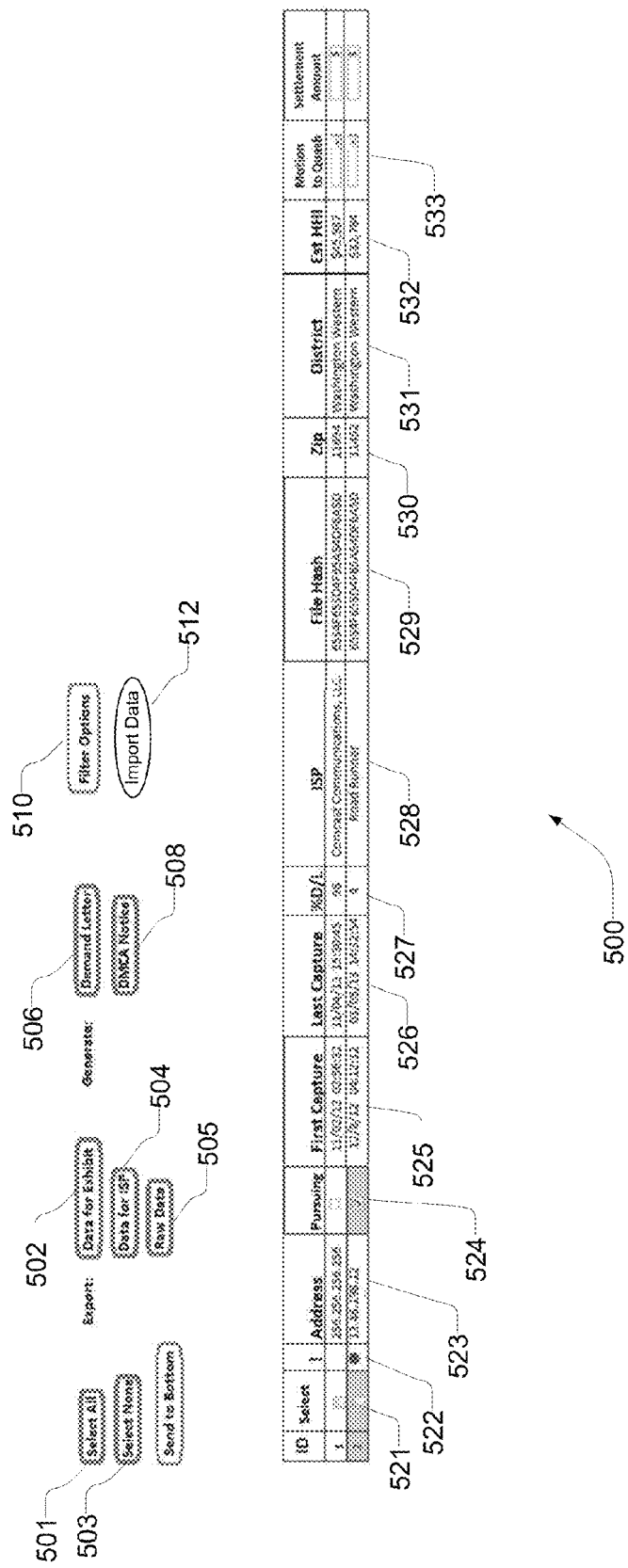

Similarly, activation of Interface 412 results in display of the "Does" page 500 illustrated in the screenshot of FIG. 5A. FIGS. 5A-D illustrate exemplary screenshots of the user interface to the infringer data in accordance with the system and methods for terminating copyright infringement by BitTorrent users described herein. In one or more embodiments of the present invention, the graphical interface 500 comprises critical information about the copyright infringers (i.e. Does) and a plurality of pushbuttons to enable manipulation of the data. For instance, important information for each infringer may comprise the following fields: "IP Address" 523; "First Capture" date and time 525; "Last Capture" date and time 526; percentage of torrent files downloaded (i.e. % D/L) 527; "ISP" 528; "File Hash" 529; "Zip Code" 530; US District Court with jurisdiction 531; and Estimated Household Income ("Est. HHI") 532. In addition, data for each Doe includes a dropdown menu 533 to documentation of status of "Motion to Quash," if any. The dropdown menu values may comprise values such as "None; Submitted; Approved; and Denied." The "Motion to Quash" field 533 provides for documenting whether or not an ISP filed a motion to quash a subpoena for records for the Doe infringer.

Figure 5B:
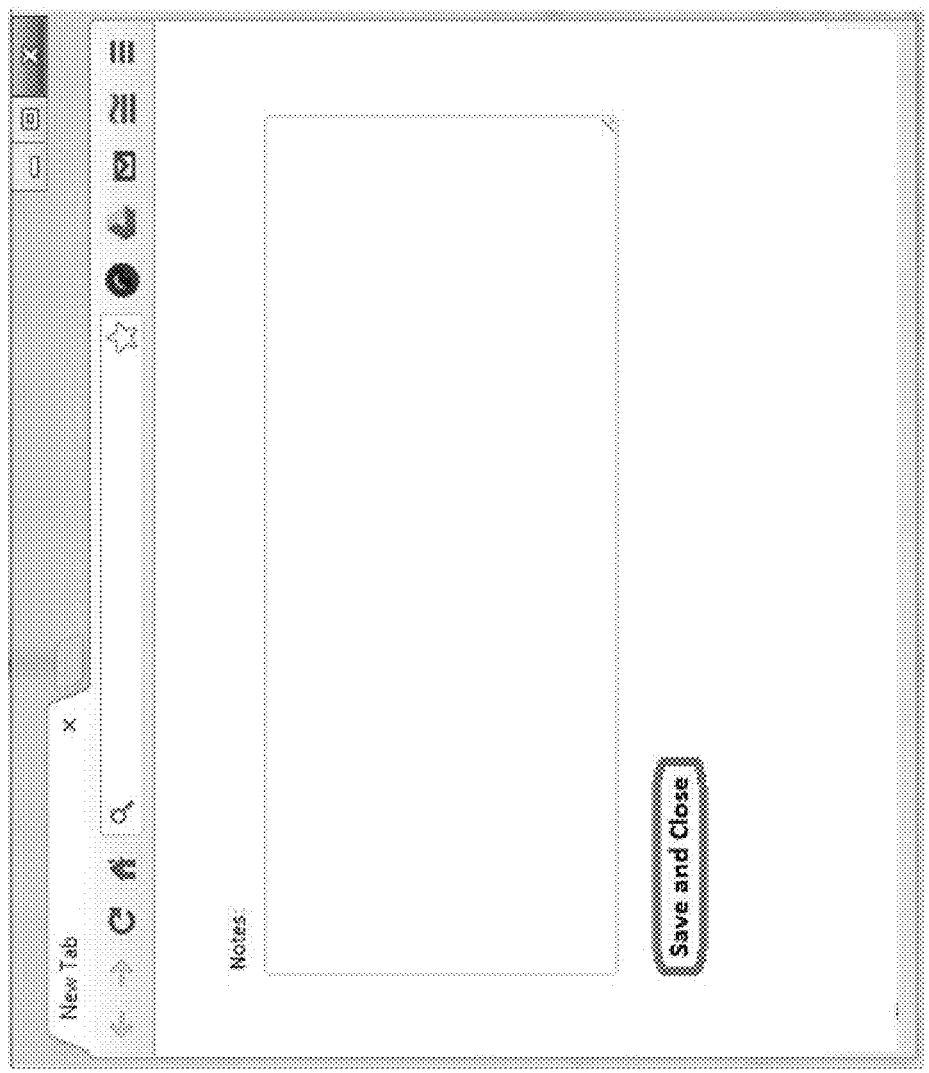

Interface 500 also includes checkbox 524 for each Doe infringer so that when checked, indicates legal action is being initiated against the Doe infringer. Also, the user may include notes about each infringer by clicking the IP Address field 523, which launches a screen to enter notes as illustrated in FIG. 5B. After entering the notes, a suitable symbol, e.g. a red dot, appears in field 522 labeled "!." Also, information for one or more Does may be managed by using pushbuttons 501, 502, 503, 504, 505, 506, 508, 510, and 512.

The "Select All" pushbutton 501 allows for one-click selection of all the Does infringers for processing. When this button is activated, the "Select" field 521 is checked for all the Does infringers. Similarly, activating button "Select None" 503 deselects all the Does on field 521. Alternatively, instead of the all or nothing functionality of buttons 501 and 503, each individual Doe may be selected or deselected by selecting its check box 521. Other pushbuttons provide functionalities that are important for copyright enforcement. For instance, the "Data for Exhibit" 502 button generates the exhibit page illustrated in FIG. 5C. Such exhibit page includes all relevant information needed for evidence in a court proceeding to show infringing activity.

Similarly, "Data for ISP" button 504 generates information needed to be included in a Subpoena for records or for a DMCA takedown letter to the relevant ISP; "Raw Data" 505 generates a dump of the raw data in the database for the selected Does; "Demand Letter" 506 will generate a demand letter to the selected Does; "DMCA Notice" 508 generates the DMCA takedown letter to the ISP; Filter Options 510 opens an interface for selecting filter options to reduce the number of infringing Does displayed; and "Import" 512 provides for importation of data from an ISP. FIG. 6 is an exemplary illustration of a data table from an ISP for infringer information in accordance with the system and methods for terminating copyright infringement by BitTorrent users described herein. As illustrated in FIG. 6, the data typically comprises geographic information about the infringing Does.

In one or more embodiments of the present invention, when Filter Options 510 is activated, the interface illustrated in screenshot of FIG. 5D is displayed. This interface allows the user to reduce the number of Does displayed on interface 500 by selecting the appropriate check boxes and/or entering date ranges in the spaces provided in FIG. 5D.

In yet another embodiment of the present invention, the system determines the identity of any other participant with which a particular participant uploaded or shared files with. The systems and methods of the present invention may accomplish this by periodically checking each participant in the IP address database and determining if they're still connected to the peer-to-peer network.

Figure 7:
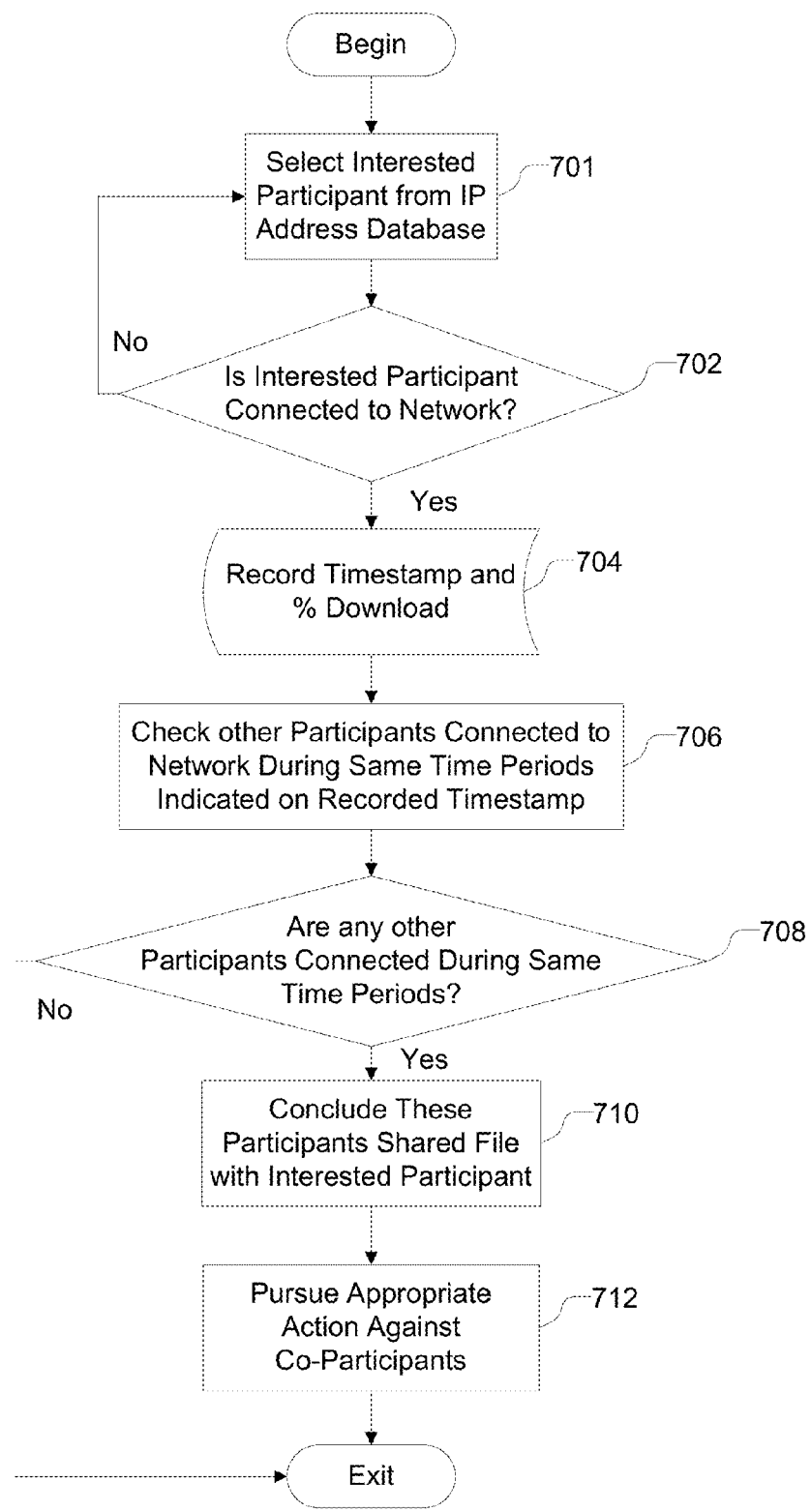
FIG. 7 is an illustration of the process determining participants in the BitTorrent network that shared files together in accordance with systems and methods of the current invention.

FIG. 7 is an illustration of the process determining participants in the BitTorrent network that shared files together in accordance with systems and methods of the current invention. As illustrated, in step 701 an interested participant is selected by choosing a participant IP address from the IP Address Database. The system then checks if the interested participant is connected to the BitTorrent network in step 702 and if a determination is made that the interested participant is not connected to the network, the systems returns to step 701 to select another participant, until all the participants are sampled. However, if a time a determination is made that a participant is connected to the network; the system proceeds to step 704 to record a timestamp, and checks and records the percentage of the download the interested participant has completed. Following this process at step 704, the system may collect the data presented in the example table below for the interested participant:

| CAPTURE TIME | % DOWNLOAD |
| --- | --- |
| Oct. 3, 2012 14:37:16 | 30 |
| Oct. 3, 2012 20:37:16 | 40 |
| Oct. 5, 2012 6:05:11 | 75 |
| Oct. 5, 2012 23:55:32 | 100 |

From the data in the table above, it is possible to conclude that the interested participant was downloading the file between the dates of Oct. 3, 2012 and Oct. 5, 2012, and that the download took at least 2.38 days to complete.

In step 706, a check is made of one or more of the remaining participants in the IP address database to determine those participants connected to the BitTorrent network during same time periods indicated in the recorded timestamp of step 704. For instance, in step 708 the system takes an IP address from the IP address database and checks its recorded timestamp to see if it corresponds to the time stamp of the interested participant. If no, the next IP address is sampled, until a determination is made of all those other participants connected to the network at the same time as the interested participant. In step 710, the other participants determined to be connected to the network at the same times as the interested participant are labeled as co-participants and possibly those who shared files with the interested participant. And in step 712 appropriate legal actions may be pursued against the co-participants.

In yet another embodiment of the present invention, the system determines specific information about the computer of the participant that is sharing files in the network, even if that participant is located behind a firewall. The systems and methods of the present invention may accomplish this by using passive fingerprinting techniques, the methods of which are commonly known in the arts. Passive fingerprinting is based on analyzing the TCP data that the computer is sending while responding to queries, for instance in step 122. It's important that the process is done passively and by using the data already being sent to prevent violation of any governmental regulations. Two methods are described herein for passive fingerprinting: TCP Packet Sniffer; and Analyzing Clock Skew of the Remote Device.

In one or more embodiments of the present invention, a simple TCP packet sniffer method is implemented for determining specific information about the computer of the participant that is sharing files in the network. The method mimics the functionality described in http://lcamtuf.coredump.cx/p0f3/README: "P0f is a tool that utilizes an array of sophisticated, purely passive traffic fingerprinting mechanisms to identify the players behind any incidental TCP/IP communications (often as little as a single normal SYN) without interfering in any way."

In another embodiment of the present invention, a method of analyzing the Clock Skew of the remote computer is implemented for use in determining specific information about the computer of the participant that is sharing files in the network. In this embodiment, the TCP timestamps from incoming connections are analyzed to measure the devices clock skew and thereby fingerprinting the physical device. The method of passive fingerprinting mimics the functionality described in the publication: "Remote physical device fingerprinting" by Tadayoshi Kohno et al., May 25, 2005, http://homes.cs.washington.edu/~yoshi/papers/PDF/KoBrCl2005PDF-Extended-lowres.pdf.

While the invention disclosed has been described by means of specific embodiments and applications thereof, numerous modifications and variations may be made thereto by those skilled in the art without departing from the scope of the invention as described and set forth in the claims attached hereto.

What is claimed is:

1. A method for tracking copyright infringing BitTorrent users, said method comprising the steps of:
   obtaining search criteria for a copyrighted work;
   periodically and automatically scraping at least one torrent file website to locate a torrent file according to said search criteria;
   automatically storing said located torrent file in a torrent file database;
   automatically verifying that said located torrent file corresponds to a media file containing said copyrighted work;
   automatically obtaining tracker server information from said located torrent file;
   automatically receiving from said tracker server a plurality of participant IP addresses of participants currently connected to the located torrent file;
   automatically storing said plurality of participant IP addresses into an IP address database;
   automatically establishing a connection with a participant using a selected IP address chosen from said plurality of participant IP addresses;
   automatically receiving a cryptographic hash, current download completion status and capture time from said participant;
   automatically determining if said participant is sharing said media file by verifying that said cryptographic hash correctly matches with said located torrent file and said current download completion status exceeds a predetermined value;
   automatically disconnecting from said participant after determination that said participant is sharing said media file;
   obtaining geographic data of said participant based on said selected IP address if said participant is determined to be sharing said media file; and
   associating said participant to a legal jurisdiction for possible action based on said geographic data.

2. The method of claim 1, further comprising the step of pursuing legal remedy in said legal jurisdiction against said participant for copyright infringement of said copyrighted work.

3. The method of claim 1, wherein said search criteria comprises a text string with predetermined set of keywords based on a type of content of said copyrighted work.

4. The method of claim 1, wherein said scraping said at least one torrent file websites to locate a torrent file according to said search criteria ignores a torrent file that was previously found.

5. The method of claim 1, further comprising the step of updating the plurality of participant IP addresses by receiving a new plurality of participant IP addresses from the tracker server after a set period of time.

6. The method of claim 1, wherein the step of verifying that said located torrent file corresponds to a media file containing said copyrighted work comprises downloading the entire media file and viewing said media file by an administrator.

7. The method of claim 1, wherein said geographic data comprises one or more of the participant's zip code, city, state, longitude, latitude, and median income of residential area.

8. The method of claim 1, further comprising the step of recording said capture time and the corresponding download completion status.

9. The method of claim 1, further comprising the step of periodically scraping, after every set period of time, each of said at least one torrent file websites to locate one or more torrent files according to said search criteria.

10. The method of claim 1, further comprising the step of maintaining a web interface that allows a user to manually set said search criteria, verify said torrent file, and verify that said participant is sharing said media file.

11. The method of claim 1, further comprising the step of maintaining a web interface that allows a user to view said participant geographic data.

12. The method of claim 1, further comprising the step of maintaining a web interface that allows a user to sort said participants according to a title of said copyrighted work in said media file.

13. The method of claim 1, further comprising the step of maintaining a web interface that allows an administrator user to sort said participants according to internet service provider.

14. The method of claim 1, further comprising the step of maintaining a web interface that allows an administrator user to sort said participants according to zip code based on said geographic data.

15. A BitTorrent copyright infringement tracking system comprising:
   a computer-readable medium comprising computer-readable instructions;
   a communication network;
   a processor configured to execute said computer-readable instructions to:
      obtain search criteria based on a copyrighted work;
      periodically scrape at least one torrent file websites to locate a torrent file according to said search criteria;
      automatically store said located torrent file in a torrent file database;
      automatically verify that said located torrent file corresponds to a media file containing said copyrighted work;
      automatically obtain tracker server information from said located torrent file;
      automatically obtain from said tracker server a plurality of participant IP addresses of all participants currently connected to said located torrent file;
      automatically store said plurality of participant IP addresses into an IP address database;

automatically establish a connection with a participant based on a selected IP address chosen from said plurality of participant IP addresses;

automatically receive a cryptographic hash, current download completion status and capture time from said participant;

automatically determine whether said participant is sharing said media file by verifying that said cryptographic hash correctly matches with said located torrent file and said current download completion status exceeds a predetermined value;

automatically disconnect from said participant after determination that said participant is sharing said media file;

automatically record said capture time and obtain geographic data of said participant based on said selected IP address if said participant is determined to be sharing said media file; and associate said participant to a legal jurisdiction for possible legal action based on said geographic data.

16. The system of claim 15, wherein said search criteria comprises a text string with predetermined set of keywords based on a type of content of said copyrighted work.

17. The system of claim 15, wherein said computer-readable instructions additionally maintains a web interface that allows an administrator user to set said search criteria, verify said torrent file, and verify that said participant is sharing said media file.

18. The system of claim 15, wherein said computer-readable instructions additionally maintains a web interface that allows a user to sort said participants according to legal jurisdictions based on said geographic data.

19. The system of claim 15, wherein said predetermined value is any value greater than zero.

20. A method for tracking copyright infringing BitTorrent users comprising:

periodically scraping at least one torrent file website to locate a torrent file associated with a copyrighted work;

automatically storing said located torrent file in a torrent file database;

automatically verifying that said located torrent file corresponds to a media file containing said copyrighted work;

automatically using tracker server information from said torrent file to obtain from said tracker server an IP address for each participant currently connected to the located torrent file;

automatically storing said IP address of said each participant in an IP address database;

automatically establishing a connection with a participant using a selected IP address chosen from said IP address database;

automatically receiving a cryptographic hash, current download completion status and capture time from said participant;

automatically determining that said participant is sharing said media file by verifying that said cryptographic hash correctly matches with said located torrent file and said current download completion status is a non-zero value; and automatically disconnecting from said participant after determination that said participant is sharing said media file.

* * * * *